United States Patent [19]
Iiyama et al.

[11] Patent Number: 5,676,915
[45] Date of Patent: Oct. 14, 1997

[54] METHOD FOR DESULFURIZING EXHAUST GAS

[75] Inventors: Shigeo Iiyama, Mobara; Kozo Ohsaki, Funabashi; Kenichi Nakagawa, Ikoma, all of Japan

[73] Assignee: Toyo Engineering Corporation, Tokyo, Japan

[21] Appl. No.: 538,482

[22] Filed: Oct. 3, 1995

[30] Foreign Application Priority Data

Oct. 7, 1994 [JP] Japan ..................... 6-243717
Nov. 28, 1994 [JP] Japan ..................... 6-292981

[51] Int. Cl.$^6$ ............................................. B01D 53/50
[52] U.S. Cl. ........................... 423/243.01; 423/243.08
[58] Field of Search ....................... 423/243.01, 243.08

[56] References Cited

FOREIGN PATENT DOCUMENTS

| | | | |
|---|---|---|---|
| 0339683 | 11/1989 | European Pat. Off. | 423/243.08 |
| 52-76273 | 6/1977 | Japan | 423/243.08 |
| 55-134632 | 10/1980 | Japan | 423/243.08 |
| 56-17930 | 4/1981 | Japan | 423/243.08 |
| 60-125230 | 7/1985 | Japan | 423/243.08 |
| 5-7045 | 1/1993 | Japan | 423/243.08 |

OTHER PUBLICATIONS

Practical Antipollution Technology Handbook Published by Chemical Industry Company, Ltd. (1 Jun. 1975) (In Japanese Language, No Author Mentioned), pp. 14–17.

"Gas Purification" by Kohl et al., 4th Ed., Gulf Publishing Co. Houston TX (1985), pp. 334–340 (No Month).

*Primary Examiner*—Michael Lewis
*Assistant Examiner*—Timothy C. Vanoy
*Attorney, Agent, or Firm*—Oblon, Spivak, McClelland, Maier & Neustadt, P.C.

[57] ABSTRACT

A method for desulfurization of an exhaust gas by a solution containing a Mg-based desulfurizing agent, followed by an oxidation step, a double decomposition step, a separation step of separating a slurry of a mixture of $Mg(OH)_2$ and gypsum dihydrate obtained in the double decomposition step, a step of returning a $Mg(OH)_2$ slurry separated in the separation step to the desulfurization step, a step of treating a gypsum dihydrate slurry in the oxidation step to convert accompanying $Mg(OH)_2$ into $MgSO_4$, a sedimentation separation step of separating gypsum dihydrate, and a step of returning a supernatant liquid in the sedimentation separation step to the double decomposition step to treat the supernatant liquid

9 Claims, 7 Drawing Sheets

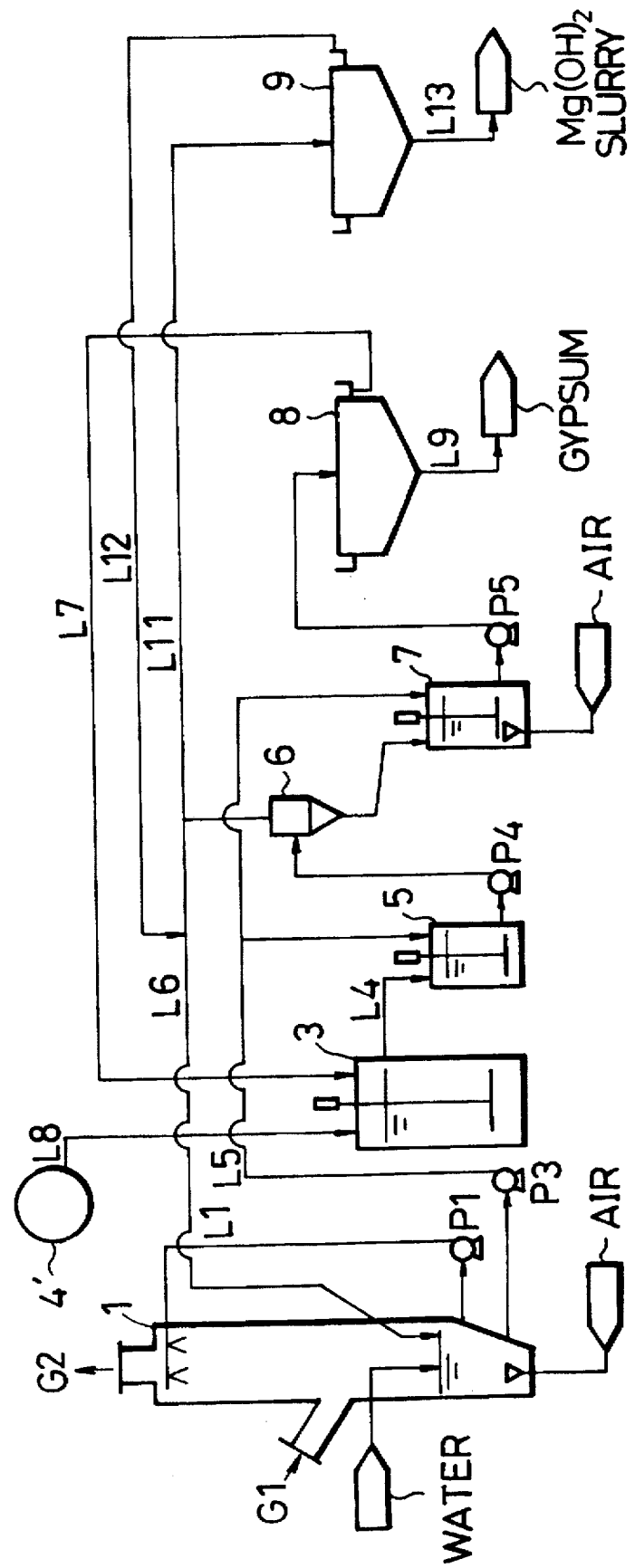

METHOD FOR DESULFURIZING EXHAUST GAS

BACKGROUND OF THE INVENTION (i) Field of the Invention

The present invention relates to a method for desulfurizing various exhaust gases containing sulfur oxides such as combustion exhaust gases of heavy oil, coal and the like.

(ii) Description of the Related Art

As one technique for desulfurizing various exhaust gases, there is known a method using a magnesium-based compound such as magnesium hydroxide or light magnesia as a desulfurizing agent. This method comprises first bringing an exhaust gas into contact with a treatment liquid containing the above-mentioned desulfurizing agent in a desulfurization step to absorb the sulfur oxides in the treatment liquid, leading this treatment liquid to an oxidation step to oxidize the treatment liquid with a gas containing oxygen such as air, thereby forming an aqueous solution of magnesium sulfate and sulfuric acid, and then neutralizing this aqueous solution with the magnesium-based compound. If the thus neutralized aqueous magnesium sulfate solution is directly discharged to the sea or a river, a magnesium source and a sulfate group will be consumed, and the discharge itself has a bad influence on the environment. In view of these inconveniences, the direct discharge of the solution as effluent is not desirable on occasion.

The above-mentioned method is desirable except for the aqueous magnesium sulfate solution being discharged. As a conventional technique regarding this method, a Kawasaki magnesium gypsum method is known (Practical Antipollution Technology Handbook (1), published by Chemical Industry Co., Ltd., p. 14). This method comprises absorbing sulfur oxides by the use of a mixed slurry of magnesium hydroxide and calcium hydroxide as a desulfurizing agent in a desulfurization step, oxidizing this treatment liquid with air or the like, while a pH of the treatment liquid is adjusted to 2.0–4.0 with sulfuric acid, to produce magnesium sulfate and gypsum dihydrate, and then separating gypsum dihydrate from the aqueous magnesium sulfate solution by a centrifugal separator in a sedimentation separation step. The thus separated aqueous magnesium sulfate solution is returned to a material preparation step containing the mixed slurry of magnesium hydroxide and calcium hydroxide, and in this step, a double decomposition reaction occurs between magnesium sulfate and a part of calcium hydroxide in the mixed slurry to produce magnesium hydroxide and gypsum dihydrate. Afterward, the mixture containing these products and the remaining calcium hydroxide is returned as the desulfurizing agent to the absorption step. In this method, however, the desulfurized solution contains gypsum dihydrate, and therefore there is a drawback that scale tends to adhere to the pump and circulation lines in the desulfurization step.

As another conventional technique in which the aqueous magnesium sulfate solution is not discharged as effluent, the following method has been disclosed (Japanese Patent Publication No. 7045/1993). An aqueous magnesium sulfate solution formed in an oxidation step is led to a double decomposition tank, and calcium hydroxide or quick lime is added thereto, so that a reaction is carried out to form gypsum dihydrate and magnesium hydroxide. Afterward, the resultant mixture is introduced into a separator such as a wet classifier, and herein, a fine particle slurry mainly containing magnesium hydroxide is separated from a coarse particle slurry containing gypsum dihydrate as a main component and magnesium hydroxide. Next, the separated former fine particle slurry is returned as the desulfurizing agent to the absorption step. On the other hand, since the latter coarse particle slurry contains a small amount of accompanying magnesium hydroxide, it is led to another step, and a part of the treatment liquid absorbing sulfur oxides is then fed from the desulfurization step to this step, so that the sulfur oxides are reacted with magnesium hydroxide in the slurry to be converted into magnesium sulfite. Afterward, in a sedimentation separation step, the solution containing magnesium sulfite is separated from gypsum dihydrate, and then is returned to the desulfurization step to be reutilized as the desulfurizing agent.

In this method, however, the utilization ratio of the magnesium-based desulfurizing agent is low, because the solubility of magnesium sulfite is low and a part of the produced magnesium sulfite is discharged together with gypsum dihydrate from the system. Therefore, it is apparent that the feed of a compensatory amount of the magnesium-based desulfurizing agent to the desulfurization step is necessary. Furthermore, a trace amount of calcium ions derived from basic calcium fed to the double decomposition tank is circulated through the system, and the calcium ions react with the desulfurizing treatment liquid in the desulfurization step to produce and precipitate calcium sulfite whose solubility in water is low, so that scale tends to adhere to the pump and circulation lines, clogging them, with the result that the smooth operation of the desulfurizing apparatus can sometimes not be continued for long.

SUMMARY OF THE INVENTION

A first object of the present invention is to provide a method for desulfurizing an exhaust gas which can solve the above-mentioned problems, can improve the utilization ratio of a magnesium-based desulfurizing agent and the separation and collection of gypsum dihydrate, and can prevent the adhesion of scale in the circulation route of a desulfurizing system and its clogging by the scale.

A second object of the present invention is to provide a method for desulfurizing an exhaust gas in which the additional feed of the magnesium-based desulfurizing agent to a desulfurization step is not required and a magnesium hydroxide slurry is secondarily produced, in addition to the above-mentioned advantages.

The present inventors have intensively investigated ways achieve the above-mentioned first object, and as a result, it has been found that according to a novel method, the utilization ratio of a magnesium-based desulfurizing agent is higher than conventional method in which an aqueous magnesium sulfite solution separated from gypsum dihydrate is directly returned to a desulfurization step. The above-mentioned novel method comprises leading, to another step, a coarse particle slurry containing gypsum dihydrate as a main component and a part of magnesium hydroxide separated by a wet classifier in a separation step, reacting magnesium hydroxide in the coarse particle slurry of gypsum dihydrate with an aqueous solution containing magnesium sulfate and sulfuric acid produced by oxidizing a desulfurizing treatment liquid with air or the like, to form magnesium sulfate (solubility=26.7 g/100 g of the aqueous solution) which has much higher solubility as compared with magnesium sulfite (solubility=0.646 g/100 g of the aqueous solution), whereby the separation of gypsum dihydrate which is sparingly soluble in water is made easy, returning the aqueous magnesium sulfate solution separated from gypsum dihydrate to a double decomposition tank to be converted into magnesium hydroxide, and the resultant magnesium hydroxide solution is fed to the desulfurization step, whereby the rate of re-utilization of magnesium-based desulfurizing agent increases compared with the prior art process which directly uses an aqueous magnesium sulfite solution obtained in the separation step of gypsum dehydrate. Furthermore, it has also been found that a trace amount of calcium ions being circulated through the system can be removed therefrom by another method which comprises feeding a part of a desulfurizing treatment liquid containing magnesium sulfite and magnesium hydrogensulfite as the main components to a mixed slurry of gypsum dihydrate and magnesium hydroxide produced in a double decomposition step to convert the trace amount to calcium sulfite, and then separating a fine particle slurry mainly containing magnesium hydroxide from a coarse particle slurry containing gypsum dihydrate and calcium sulfite by a wet classifier.

The present inventors have intensively investigated ways to achieve the above-mentioned second object, and as a result, there has been found still another method in which the additional feed of a magnesium-based desulfurizing agent to a desulfurization step is not required except at the time of the start-up of the desulfurization step, and in which magnesium hydroxide is secondarily produced. This method comprises using basic compounds obtained by calcining and digesting a dolomite in place of calcium hydroxide, quick lime or the like which can be used in the double decomposition of an aqueous magnesium sulfate solution produced in an oxidation step in accordance with the above-mentioned conventional technique, regulating a slurry after the double decomposition reaction so that there is more magnesium hydroxide than mols of $SO_2$ to be adsorbed in the desulfurizastion step, and the gypsum dihydrate is substantially equimolar with the absorbed $SO_2$, separating the slurry into the magnesium hydroxide slurry and the gypsum dihydrate slurry by a wet classifier, returning a part of the magnesium hydroxide slurry which has substantially equimolar magnesium hydroxide with $SO_2$ so that the $SO_2$ can be absorbed to the desulfurization step, and taking out the remaining magnesium hydroxide slurry as a by-product from the system. Moreover, it has been found that according to a further novel method, the utilization ratio of a magnesium-based desulfurizing agent is higher than a conventional method in which an aqueous magnesium sulfite solution separated from gypsum dihydrate is directly returned to a desulfurization step. This novel method comprises leading, to another step, a coarse particle slurry containing gypsum dihydrate as a main component and a part of the magnesium hydroxide separated by a wet classifier in a separation step, reacting magnesium hydroxide in the coarse particle slurry of gypsum dihydrate with an aqueous solution which contains magnesium sulfate and sulfuric acid and which is produced by oxidizing a desulfurizing treatment liquid with air, to form magnesium sulfate (solubility=26.7 g/100 g of the aqueous solution) which has a much high solubility as compared with magnesium sulfite (solubility=0.646 g/100 g of the aqueous solution), whereby the separation of gypsum dihydrate which is sparingly soluble in water is easy, returning the aqueous magnesium sulfate solution separated from gypsum dihydrate to a double decomposition tank to convert the same into magnesium hydroxide, and then returning magnesium hydroxide to the desulfurization step.

In addition, it has also been found that when a basic compound obtained by calcining and digesting a dolomite is used in a double decomposition reaction, a trace amount of calcium ions which are being circulated through the system can also be removed therefrom by a still another method which comprises feeding a part of a desulfurizing treatment liquid containing magnesium sulfite and magnesium hydrogensulfite as main components to a mixed slurry of gypsum dihydrate and magnesium hydroxide subjected to a double decomposition step to convert the trace amount of the dissolved calcium ions present in a circulating solution to calcium sulfite, and then separating a fine particle slurry mainly containing magnesium hydroxide from a coarse particle slurry containing gypsum dihydrate and calcium sulfite by a wet classifier.

That is to say, the aspects of the present invention are as follows.

1. A method for desulfurization which comprises a desulfurization step of continuously bringing a treatment liquid containing a magnesium-based desulfurizing agent into gas-liquid contact with an exhaust gas containing sulfur oxides to absorb and remove the sulfur oxides contained in the exhaust gas; one or two oxidation steps of treating, with a gas containing oxygen, the solution containing the resultant desulfurization step treatment liquid to convert contained magnesium salts into magnesium sulfate; a double decomposition step of reacting magnesium sulfate contained in the solution obtained in the oxidation steps with basic calcium compounds to carry out double decomposition, thereby decomposing the magnesium sulfate and the basic calcium compounds into magnesium hydroxide and gypsum dihydrate; a separation step of separating a slurry of a mixture of magnesium hydroxide and gypsum dihydrate obtained in the double decomposition step into a magnesium hydroxide slurry and a gypsum dihydrate slurry by a wet classifier; a step of returning the magnesium hydroxide slurry separated in the separation step to the desulfurization step; a step of treating, in the above-mentioned one oxidation step, the gypsum dihydrate slurry separated in the separation step to convert accompanying magnesium hydroxide into magnesium sulfate; a sedimentation separation step of sedimenting and separating gypsum dihydrate from the gypsum dihydrate slurry subjected to the oxidation step; and a step of returning a supernatant liquid in the sedimentation separation step to the double decomposition step to treat the supernatant liquid.

2. A method for desulfurization which comprises a desulfurization step of continuously bringing a treatment liquid containing a magnesium-based desulfurizing agent into gas-liquid contact with an exhaust gas containing sulfur oxides to absorb and remove the sulfur oxides contained in the exhaust gas; an oxidation step of treating, with a gas containing oxygen, the solution containing the resultant desulfurization step treatment liquid to convert contained magnesium salts into magnesium sulfate; a double decomposition step of reacting magnesium sulfate contained in the solution obtained in the oxidation step with basic calcium compounds to decompose the magnesium sulfate and the basic calcium compounds into magnesium hydroxide and gypsum dihydrate; a calcium ion conversion step of feeding the desulfurization step treatment liquid to a mixed slurry of magnesium hydroxide and gypsum dihydrate obtained in the double decomposition step to convert dissolved calcium ions into calcium sulfite; a separation step of separating a magnesium hydroxide slurry from the slurry containing gypsum dihydrate particles and calcium sulfite particles by a wet classifier; and a step of returning the magnesium hydroxide slurry separated by the wet classifier to the desulfurization step.

3. A method for desulfurization which comprises a desulfurization step of continuously bringing a treatment liquid containing a magnesium-based desulfurizing agent into gas-liquid contact with an exhaust gas containing sulfur oxides to absorb and remove the sulfur oxides contained in the exhaust gas; one or two oxidation steps of treating, with a gas containing oxygen, the solution containing the resultant desulfurization step treatment liquid to convert contained magnesium salts into magnesium sulfate; a double decomposition step of reacting magnesium sulfate contained in the solution obtained in the oxidation step with basic compounds obtained by calcining and digesting a dolomite to carry out double decomposition, thereby decomposing the magnesium sulfate and the basic compounds into magnesium hydroxide and gypsum dihydrate; a separation step of separating a slurry of a mixture of magnesium hydroxide and gypsum dihydrate obtained in the double decomposition step into a magnesium hydroxide slurry and a gypsum dihydrate slurry by a wet classifier; a concentration separation step, after returning a part of the magnesium hydroxide slurry separated in the separation step to the desulfurization step, of concentrating and separating the remaining magnesium hydroxide slurry; a step of treating, in the above-mentioned one oxidation step, the gypsum dihydrate slurry separated in the separation step to convert accompanying magnesium hydroxide into magnesium sulfate; a sedimentation separation step of sedimenting and separating gypsum dihydrate from the gypsum dihydrate slurry subjected to the oxidation step; a step of returning a supernatant liquid in the sedimentation separation step to the double decomposition step to treat the supernatant liquid; and a step of taking out, from a system as a by-product, a concentrated magnesium hydroxide slurry concentrated in the concentration separation step.

4. A method for desulfurization which comprises a desulfurization step of continuously bringing a treatment liquid containing a magnesium-based desulfurizing agent into gas-liquid contact with an exhaust gas containing sulfur oxides to absorb and remove the sulfur oxides contained in the exhaust gas; an oxidation step of treating, with a gas containing oxygen, the solution containing the resultant desulfurization step treatment liquid to convert contained magnesium salts into magnesium sulfate; a double decomposition step of reacting magnesium sulfate contained in the solution obtained in the oxidation step with basic compounds obtained by calcining and digesting a dolomite to decompose the magnesium sulfate and the basic compounds into magnesium hydroxide and gypsum dihydrate; a calcium ion conversion step of feeding the desulfurization step treatment liquid to a slurry of magnesium hydroxide and gypsum dihydrate mixture obtained in the double decomposition step to convert dissolved calcium ions into calcium sulfite; a separation step of separating a magnesium hydroxide slurry from the slurry containing gypsum dihydrate particles and calcium sulfite particles by a wet classifier; a step of returning a part of the magnesium hydroxide slurry separated by the wet classifier to the desulfurization step; and a step of taking out the remaining magnesium hydroxide slurry from a system as a by-product.

5. The method for desulfurization according to the method 1 or 3 which comprises adding, after the double decomposition step, a calcium ion conversion step of feeding the desulfurization step treatment liquid to a slurry of magnesium hydroxide and gypsum dihydrate mixture obtained in the double decomposition step to convert dissolved calcium ions into calcium sulfite.

Among the above-mentioned methods 1 to 5, the methods 1, 2 and 5 correspond to the first object, and the methods 3, 4 and 5 correspond to the second object. Next, these methods will be described in detail, but the simple expression "the present invention" means requirements common to these methods, "the first invention" means the method 1, 2 or 5, and "the second invention" means the method 3, 4 or 5.

BRIEF DESCRIPTION OF THE DRAWINGS

FIGS. 1 to 3 are schematic views illustrating a constitutional embodiment of an apparatus for use in a desulfurization method of the present invention (first invention).

FIGS. 1, 2 and 3 illustrate various embodiments of such first invention.

FIGS. 5 to 7 are schematic views illustrating a constitutional embodiment of an apparatus for use in a desulfurization method of the present invention (second invention). FIGS. 5, 6 and 7 illustrate various embodiments of this invention.

DESCRIPTION OF THE PREFERRED EMBODIMENTS

Figure 1:
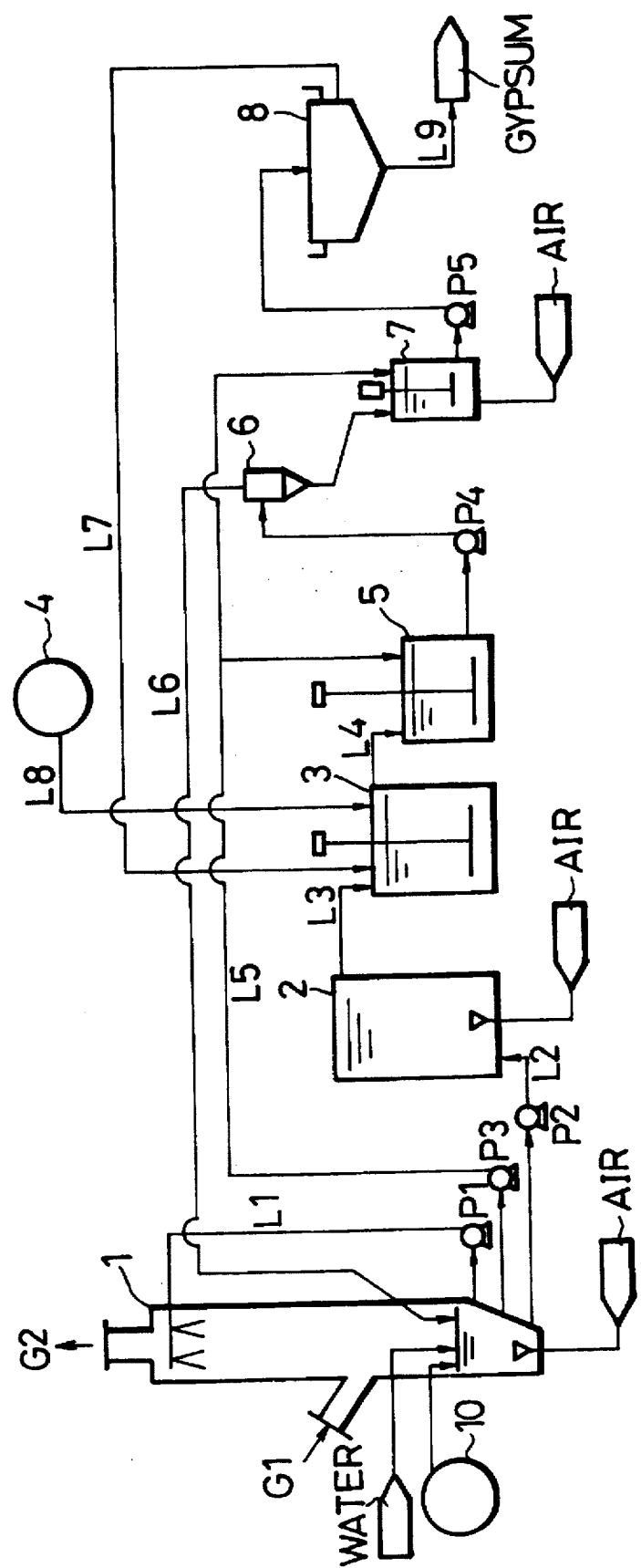

A magnesium-based desulfurizing agent which can be used in the present invention is a basic magnesium compound in which the main component is magnesium oxide or magnesium hydroxide. The compound is magnesium hydroxide obtained from magnesium in seawater as a raw material, or magnesium oxide obtained by calcining a magnesite ore or magnesium hydroxide obtained by digesting the magnesium oxide.

A desulfurization step is a step in which an exhaust gas containing sulfur oxides is brought into contact with an aqueous solution containing the above-mentioned magnesium-based desulfurizing agent to absorb the sulfur oxides in this aqueous solution. A device for the desulfurization step comprises a tower having a structure for efficiently performing the gas-liquid contact, and there is often used a type in which an aqueous solution is sprayed through a nozzle and the gas is streamed in the state of counter flow or parallel flow. Furthermore, to increase the gas-liquid contact efficiency, fillers, shelves or the like may be arranged in the tower.

A desulfurization step treatment liquid is an aqueous solution in which magnesium sulfate, magnesium hydrogensulfite and magnesium sulfite produced by the reaction of an aqueous magnesium-based desulfurizing agent solution with the sulfur oxides are intermingled.

A desulfurization temperature is 80° C. or less, preferably 60° C. or less, and a pH is in the range of 5.0 to 7.5, preferably from 5.5 to 7.0.

In the desulfurization step, the solubility of magnesium sulfite in water is low, and hence in order to prevent its precipitation, oxidation is usually caused to take place by blowing air or the like to form magnesium sulfate having a high solubility in water, thereby controlling the concentration of magnesium sulfite to a level lower than a certain value. Alternately, instead of blowing air in the desulfurization step, the concentration of magnesium sulfite can be controlled to the desired level by charging a part of the treated liquid in an oxidation step, which is described later, into the desulfurization treatment liquid.

In an oxidation step, a tank type reactor is usually used, and magnesium sulfite and magnesium hydrogensulfite produced by the reaction of the magnesium-based desulfurizing agent with the sulfur oxides in the desulfurization tower are oxidized with a gas containing oxygen to form magnesium sulfate and sulfuric acid. In general, the concentration of the magnesium sulfate is in the range of 3 to 10% by weight, and a pH is in the range of 2 to 3. In this oxidation step, stirring and mixing may be carried out.

No particular restriction is put on a kind of gas other than oxygen in the gas containing oxygen, so long as it is inert to the desulfurization step treatment liquid. Usually, air is used. One or two oxidation steps are employed, and a distinction between these oxidation steps will be described hereinafter.

A double decomposition step is basically a step in which magnesium sulfate produced in the oxidation step is reacted with calcium hydroxide to double decompose into magnesium hydroxide and gypsum dihydrate, whereby the above-mentioned magnesium-based desulfurizing agent is reproduced from magnesium sulfate.

The first and second inventions of the present application are different from each other in the calcium hydroxide source, and this difference leads to a difference of subsequent steps. The first invention will be described first.

First Invention

In the double decomposition step, a tank type reactor is usually used, and a basic calcium compound is added to an aqueous solution of magnesium sulfate and sulfuric acid produced in the oxidation step, followed by stirring and mixing. First, sulfuric acid is reacted with the basic compound to form gypsum dihydrate, and magnesium sulfate is then reacted with basic calcium to form gypsum dihydrate and magnesium hydroxide.

As the basic calcium compound which can be used in the double decomposition step, calcium hydroxide, calcium oxide, calcium carbonate and mixtures thereof are preferable, and when fed to the reactor, the basic calcium compound may take the form of powder, but the form of an aqueous slurry is most preferable from the viewpoint of operating efficiency.

The feed of the basic calcium compound is most preferably such that the pH of the solution in the double decomposition step may be about 11, because such a feed permits the formation of large particles of gypsum dihydrate.

A reaction temperature is 80° C. or less, preferably 60° C. or less. If control is made so as to obtain such a temperature, the produced gypsum dihydrate can generally grow to coarse particles having an average particle diameter (major axis) of 70 μm or more, usually 200 μm or less. On the other hand, magnesium hydroxide becomes fine particles having a particle diameter of 1 μm or less, usually about 0.3–1 μm. These particles cohere, so that their size becomes apparently about 10–20 μm.

In a calcium ion conversion step, a tank type reactor is usually used. Gypsum dihydrate (solubility=0.208 g of calcium sulfate per 100 g of an aqueous solution) is dissolved in water, and therefore it is dissolved as much as about 0.06% by weight as calcium ions. These calcium ions are mixed with magnesium hydrogensulfite in the desulfurization step treatment solution by stirring to form water-insoluble calcium sulfite (solubility=0.0051 g of calcium sulfite per 100 g of an aqueous solution). In consequence, the amount of the calcium ions in water decreases to about 0.002% by weight which is 1/30 of about 0.06% by weight. If a pH is 6 or less, magnesium hydrogensulfite reacts not only with dissolved calcium ions but also with coexistent magnesium hydroxide. Therefore, the pH is 6 or more, preferably in the range of 6 to 11. A reaction temperature is 80° C. or less, preferably 60° C. or less.

After the calcium ion conversion step, a solution (slurry) containing magnesium hydroxide, gypsum dihydrate and calcium sulfite is separated into a fine particle slurry mainly containing magnesium hydroxide and a coarse particle slurry mainly containing gypsum dihydrate by a wet classifier in a separation step, and the fine particle slurry is returned as the desulfurizing agent to the desulfurization tower. The coarse particle slurry mainly containing gypsum dihydrate is accompanied by 10 to 30% by weight of magnesium hydroxide.

As the wet classifier which can be used herein, a wet cyclone, a centrifugal settler and a similar classifier can be used, and the wet cyclone is particularly preferable.

The coarse particle slurry is led to the oxidation step. In the case that one oxidation step is present, it is led to this oxidation step, but in the case that two oxidation steps are present, it is led to either of the two steps. The accompanying magnesium hydroxide is mixed by stirring with an aqueous solution of magnesium sulfate and sulfuric acid produced by oxidizing the treated desulfurizing solution with a gas containing oxygen such as air to carry out a reaction, thereby forming magnesium sulfate.

The coarse particle slurry may be led to the other oxidation step, and in this oxidation step, magnesium sulfate and sulfuric acid may be produced, and then fed, followed by stirring and mixing. This procedure can provide the same effect as in the above-mentioned case wherein the coarse particle slurry is treated in one oxidation step. Thus, needless to say, the present invention can also cover this process.

After separated from gypsum dihydrate in a sedimentation separation step, magnesium sulfate is returned to a double decomposition metathesis step, and converted into magnesium hydroxide by a double decomposition reaction, returned to the desulfurization step, and then reutilized therein. A part of the aqueous magnesium sulfate solution from the sedimentation separation step is returned in some cases to the desulfurization step to dilute the concentration of magnesium sulfite which is formed in the desulfurization step. In the desulfurization step, 1 mol of magnesium hydroxide absorbs 1 mol of sulfur dioxide gas, and the produced magnesium sulfite further absorbs 1 mol of sulfur dioxide gas in accordance with the following reactions:

$$Mg(OH)_2 + SO_2 \rightarrow MgSO_3 + H_2O$$

$$MgSO_3 + H_2O + SO_2 \rightarrow Mg(HSO_3)_2$$

As understood from the foregoing, in the first invention, nearly all of the magnesium sulfate separated in the sedimentation separation step is converted into magnesium hydroxide having a sulfur dioxide gas absorption ability twice as much as that of magnesium sulfite, and then fed to the desulfurization step. Therefore, the utilization ratio of the magnesium-based desulfurizing agent is higher as compared with a conventional method in which an aqueous magnesium sulfite solution separated in the sedimentation separation step is directly returned to the desulfurization step.

Furthermore, according to the conventional method, in the desulfurization step treatment liquid, magnesium sulfate is usually dissolved in an amount larger than magnesium sulfite. Therefore, the aqueous magnesium sulfite solution separated in the sedimentation separation step also contains magnesium sulfate, and this solution is returned to the desulfurization step without converting magnesium sulfate into magnesium hydroxide. Hence, it is apparent that the utilization ratio of the desulfurizing agent in the method of the present invention is further improved.

Gypsum dihydrate separated in the sedimentation separation step can be widely used for cements and gypsum wallboards.

In this first invention, gypsum dihydrate separated by the wet classifier is treated with the aqueous solution of magnesium sulfate and sulfuric acid produced in the oxidation step, whereby magnesium hydroxide which accompanies gypsum dihydrate is converted into water-soluble magnesium sulfate. Accordingly, in the sedimentation separation step, the separation efficiency of gypsum dihydrate from magnesium sulfate is high, and so the reutilization of the magnesium-based desulfurizing agent can be efficiently carried out and the yield of gypsum dihydrate for another use is also high. In addition, almost all magnesium sulfate can be converted into magnesium hydroxide having a high sulfur dioxide gas absorption ability and this magnesium hydroxide can be fed to the desulfurization step. Thus, the utilization ratio of the magnesium-based desulfurizing agent is higher, as compared with the case where an aqueous mixture of magnesium sulfite and magnesium sulfate is recovered and then fed to the desulfurization step.

In addition, when the desulfurizing treatment liquid is fed to the solution produced in the double decomposition step, dissolved calcium ions react with sulfite ions contained in the treatment liquid to form water-insoluble calcium sulfite, and the thus formed calcium sulfite is removed from the system by the separation step using the wet classifier and the sedimentation separation step. In consequence, the first invention can prevent scale adhesion and clogging of circulation pumps and lines by the precipitation of calcium sulfite formed by the reaction of a small amount of the calcium ions dissolved in water and circulated through the system with the desulfurizing treatment liquid in the desulfurization step as in a conventional method, and so a smooth operation can be continuously carried out. In addition, in the calcium ion conversion step, the concentration of particles formed in the double decomposition step is diluted with the treatment liquid from the desulfurization step, and consequently, an efficiency of the subsequent separation by the wet classifier or the like is higher than in the conventional method.

Second Invention

In the second invention, as the calcium source for the double decomposition reaction, basic compounds are used which can be obtained by calcining and digesting a dolomite.

The dolomite comprises $CaMg(CO_3)_2$ as a main component. It contains 45.7% by weight of calcium carbonate and 54.3% by weight of magnesium carbonate as theoretical values, but its composition depends upon the quarry and any dolomite is usable. When calcined at 900° to 1,000° C., the dolomite is converted into a nearly equimolar mixture of calcium oxide (CaO) and magnesium oxide (MgO), and when this mixture is reacted with water to carry out digestion, a slurry of a basic compound mixture of calcium hydroxide [$Ca(OH)_2$] and magnesium hydroxide [$Mg(OH)_2$] can be obtained.

In the double decomposition step, a tank type reactor is usually used, and the above-mentioned basic compound slurry is added to an aqueous solution of magnesium sulfate and sulfuric acid produced in the oxidation step, followed by stirring and mixing. First, sulfuric acid is reacted with the basic compounds to form gypsum dihydrate, and after sulfuric acid has been consumed in this reaction, magnesium sulfate is reacted with calcium hydroxide in the basic compounds to form gypsum dihydrate and magnesium hydroxide. The amount of the basic compound slurry to be added is adjusted so that mols of calcium hydroxide in this slurry may be equal to the total of mols of sulfuric acid and magnesium sulfate in the solution subjected to the oxidation step. Since the total mols of sulfuric acid and magnesium sulfate are substantially equal to mols of $SO_2$ absorbed by the aqueous solution containing the desulfurizing agent in the desulfurization step, a double decomposition reaction permits the production of gypsum dihydrate equimolar to mols of absorbed $SO_2$, and magnesium hydroxide in the added slurry of the basic compounds eventually remains unreacted.

A reaction temperature is 80° C. or less, preferably 60° C. or less. Under a controlled temperature, the produced gypsum dihydrate can generally grow to coarse particles having an average particle diameter (major axis) of 70 μm or more, usually 200 μm or less. On the other hand, magnesium hydroxide becomes fine particles having a particle diameter of 1 μm or less, usually about 0.3–20 μm. These particles cohere, so that their size becomes apparently about 10–20 μm.

The concentration of the basic compound slurry is adjusted so that the pH of the solution in the double decomposition step may be about 11, which is most preferable in that the particle diameter of the gypsum dihydrate can be enlarged.

The calcium ion conversion step is the same as in the first invention and a tank type reactor is usually used. Gypsum dihydrate (solubility=0.208 g of calcium sulfate per 100 g of an aqueous solution) is dissolved in water, and therefore it is dissolved as much as about 0.06% by weight as calcium ions. These calcium ions are mixed with magnesium hydrogensulfite in the desulfurization step treatment liquid by stirring to form water-insoluble calcium sulfite (solubility= 0.0051 g of calcium sulfite per 100 g of an aqueous solution). In consequence, the amount of the calcium ions in water decreases to about 0.002% by weight which is 1/30 of about 0.06% by weight. If a pH is 6 or less, magnesium hydrogensulfite reacts with not only dissolved calcium ions but also coexistent magnesium hydroxide. Therefore, the pH is 6 or more, preferably in the range of from 6 to 11. A reaction temperature is 80° C. or less, preferably 60° C. or less.

After the calcium ion conversion step, a solution (slurry) containing magnesium hydroxide, gypsum dihydrate and calcium sulfite is separated into a fine particle slurry mainly containing magnesium hydroxide and a coarse particle slurry mainly containing gypsum dihydrate by a wet classifier in the separation step. As the wet classifier which can be used herein, a wet cyclone, a centrifugal settler and a similar classifier can be used, and the wet cyclone is particularly preferable.

The fine particle slurry contains more mols of magnesium hydroxide than the mols of $SO_2$ absorbed in the desulfurization step, and so a slurry containing magnesium hydroxide in an amount substantially equal to that of $SO_2$ to be absorbed in the desulfurization step is returned as the desulfurizing agent to the desulfurization step. The remaining magnesium hydroxide slurry is subjected to a concentration separation step which will be described hereinafter, to form a concentrated magnesium hydroxide slurry, which is taken out as a by-product from the system and then used for another use.

The coarse particle slurry mainly comprising gypsum dihydrate is accompanied by 10 to 30% by weight of magnesium hydroxide. This coarse particle slurry is led to the oxidation step. In the case that one oxidation step is present, it is led to this oxidation step, but in the case that two oxidation steps are present, it is led to either of two steps. The accompanying magnesium hydroxide is mixed by stirring with an aqueous solution of magnesium sulfate and sulfuric acid produced by oxidizing the desulfurizing treatment liquid with a gas containing oxygen such as air to carry out a reaction, thereby forming magnesium sulfate.

The coarse particle slurry may be led to the other step, wherein the slurry is mixed with an aqueous mixture of magnesium sulfate and sulfuric acid which is produced in the oxidation step. This procedure can provide the same effect as in the above-mentioned case wherein the coarse particle slurry is treated in one oxidation step. Thus, needless to say, the present invention can also cover this process.

After separated from gypsum dihydrate in a sedimentation separation step, magnesium sulfate is returned to the double decomposition step, and it is converted into magnesium hydroxide by a double decomposition reaction, returned to the desulfurization step, and reutilized therein. In the desulfurization step, 1 mol of magnesium hydroxide absorbs 1 mol of sulfur dioxide gas, and the produced magnesium sulfite further absorbs 1 mol of the sulfur dioxide gas in accordance with the following reactions:

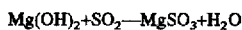

$$Mg(OH)_2 + SO_2 \rightarrow MgSO_3 + H_2O$$

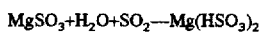

$$MgSO_3 + H_2O + SO_2 \rightarrow Mg(HSO_3)_2$$

As understood from the foregoing, also in the second invention, almost all magnesium sulfate separated in the sedimentation separation step is converted into magnesium hydroxide having a sulfur dioxide gas absorption ability twice as much as that of magnesium sulfite, and then fed to the desulfurization step. Therefore, the utilization ratio of the magnesium-based desulfurizing agent is higher as compared with the conventional method in which the aqueous magnesium sulfite solution separated in the sedimentation separation step is directly returned to the desulfurization step.

Furthermore, according to the conventional method, in the desulfurization step treatment liquid, magnesium sulfate is usually dissolved in an amount larger than magnesium sulfite. Therefore, the aqueous magnesium sulfite solution separated in the sedimentation separation step also contains magnesium sulfate, and this solution is returned to the desulfurization step without converting magnesium sulfate into magnesium hydroxide. Hence, it is apparent that the utilization ratio of the desulfurizing agent in the method of the present invention is further improved.

Gypsum dihydrate separated in the sedimentation separation step can be widely used for cements and gypsum wallboards, as in the case of the first invention.

The above-mentioned "remaining magnesium hydroxide slurry" taken out from the system is subjected to the concentration separation step in which the concentration is carried out by a sedimentation separation device or the like, and in this step, the slurry is concentrated up to about 35% by weight which is a selling specification of the usual magnesium hydroxide slurry. Water separated in this step is returned to the desulfurization step, whereby the discharge of water from the system can be prevented.

Also in the second invention, gypsum dihydrate separated by the wet classifier is treated with the aqueous solution of magnesium sulfate and sulfuric acid produced in the oxidation step, and magnesium hydroxide which is accompanied with gypsum dihydrate is converted into water-soluble magnesium sulfate. Consequently, in the sedimentation separation step, the separation efficiency of magnesium sulfate from gypsum dihydrate is high, so that the reutilization of the magnesium-based desulfurizing agent can be efficiently carried out and the yield of gypsum dihydrate is also high. In addition, almost all magnesium sulfate can be converted into magnesium hydroxide having a high sulfur dioxide gas absorption ability and this magnesium hydroxide can be fed to the desulfurization step. Thus, the utilization ratio of the magnesium-based desulfurizing agent is higher, as compared with the case where a mixed aqueous solution of magnesium sulfite and magnesium sulfate is recovered and then fed to the desulfurization step.

In addition, when the desulfurizing treatment liquid is fed to the solution produced in the double decomposition step, dissolved calcium ions react with sulfite ions contained in the treatment liquid to form water-insoluble calcium sulfite, and the thus formed calcium sulfite is removed from the system by the separation step using the wet classifier and the sedimentation separation step. In consequence, the second invention can prevent scale adhesion in and the clogging of circulation pumps and lines by the precipitation of calcium sulfite formed by the reaction of a trace amount of the calcium ions dissolved in water and circulated through the system with the desulfurizing treatment liquid in the desulfurization step as in a conventional method, and so a smooth operation can be continuously carried out. In addition, in the calcium ion conversion step, the concentration of particles formed in the double decomposition step is diluted with the treatment liquid from the desulfurization step, and consequently, an efficiency of the subsequent separation by the wet classifier or the like is higher than in the conventional method.

Moreover, in the present invention, the basic compounds obtained by calcining and digesting a dolomite are used in the double decomposition step, and therefore the concentrated slurry of magnesium hydroxide can be secondarily produced.

Next, a method for desulfurizing an exhaust gas of the present invention will be described in detail in accordance with examples with reference to drawings attached hereto, but the scope of the present invention should not be limited to these examples.

EXAMPLE 1

This example is concerned with an example of the first invention in which two oxidation steps are present. FIG. 1 shows a constitutional embodiment of an apparatus for use in a method for desulfurizing an exhaust gas regarding this example. In this drawing, reference numeral 1 is a desulfurizing tower, and in this tower, a treatment liquid containing a magnesium-based desulfurizing agent is allowed to stream down in a showery state from the top, whereby this treatment liquid is brought into gas-liquid contact with an exhaust gas G1 containing sulfur oxides introduced from a lower portion of the tower. In consequence, the sulfur oxides are absorbed and fixed as magnesium sulfite and the like in the treating liquid by a desulfurizing reaction, and an exhaust gas G2 from which the sulfur oxides have been removed is discharged from the tower through an upper portion of the tower.

The exhaust gas fed to the desulfurizing tower has a high temperature, and so it is cooled by spraying water through a nozzle. The flow rate of the exhaust gas is 100 Nm$^3$/hr, and the concentration of SO$_2$ is 1000 ppm.

The treatment liquid which has streamed down to the lower portion of the desulfurizing tower 1, i.e., the desulfurizing liquid absorbing the sulfur oxides is forwarded together with the newly fed treatment liquid to the upper portion through a pump P1 and a line L1, and the treatment liquid is continuously circulated through the desulfurizing tower 1 by repeating this operation cycle. The concentration of the salts in this treatment liquid is adjusted to 7.50% by weight in terms of magnesium sulfate, the total concentration of magnesium sulfite and magnesium hydrogensulfite is adjusted to 1.50% by weight in terms of magnesium sulfate, and a pH is adjusted to 6.2–6.4. As a result, a desulfurization ratio in each example can be maintained at 95%.

The treatment liquid in the desulfurization step is fed to a first oxidization tank 2 by a pump P2 and a line L2, and then oxidized with air to become an aqueous solution of magnesium sulfate and sulfuric acid.

The thus formed aqueous solution of magnesium sulfate and sulfuric acid is fed to a double decomposition tank 3 through a line L3. Next, an aqueous magnesium sulfate solution separated from a sedimentation tank which will be described hereinafter is fed to double decomposition tank 3, and a 30% aqueous calcium hydroxide slurry is fed from a calcium hydroxide feed tank 4 through a line L8. Afterward, these materials are stirred and mixed by a stirrer to react magnesium sulfate and sulfuric acid with calcium hydroxide, thereby producing solid particles of gypsum dihydrate and magnesium hydroxide. The reaction temperature is 50° C..

The thus obtained aqueous slurry containing the two kinds of solid particles is next led to a calcium ion conversion tank 5 through a line L4, in which the aqueous slurry is uniformly mixed by stirring with a part of the desulfurization step treatment liquid absorbing the sulfur compounds fed from the desulfurizing tower 1 via a pump P3 and a line L5, so that the calcium ions dissolved in water are reacted mainly with magnesium sulfite and magnesium hydrogensulfite in the above-mentioned treatment liquid to produce and precipitate water-insoluble calcium sulfite.

Next, the aqueous slurry containing these solid particles of gypsum dihydrate, magnesium hydroxide and calcium sulfite is led to a wet classifier 6 by means of a pump P4, and in the wet classifier, the aqueous slurry is separated into a fine particle slurry mainly containing magnesium hydroxide and a coarse particle slurry containing gypsum dihydrate, calcium sulfite and a part of magnesium hydroxide.

The fine particle slurry mainly containing magnesium hydroxide is returned to the desulfurizing tower via a line L6. The coarse particle slurry mainly containing gypsum dihydrate is led to a second oxidation tank 7, in which while air is blown, the coarse particle slurry is uniformly mixed by a stirrer with a part of the desulfurization step treatment liquid absorbing the sulfur compounds fed from the desulfurizing tower 1 via the pump P3 and the line L5, so that magnesium hydroxide which accompanies gypsum dihydrate is reacted with sulfuric acid produced by the oxidation of magnesium hydrogensulfite to be converted into water-soluble magnesium sulfate.

This solution containing magnesium sulfate is led to a sedimentation tank 8 together with gypsum dihydrate dispersed therein and unconcerned with the above-mentioned reaction, and in the sedimentation tank, the solution is separated into gypsum dihydrate and a solution containing magnesium sulfate. Afterward, gypsum dihydrate in a lower portion is taken out from the system through a line L9, and the solution containing magnesium sulfate in an upper portion is returned to the double decomposition tank 3 via a line 7.

Test results are shown in Table 1. In this table, Mg (mol/hr) and Ca (mol/hr) are amounts (mol/hr) of magnesium and calcium in terms of magnesium sulfate and gypsum dihydrate, respectively, in the lines represented by line symbols. Among them, Mg in each of the lines L2, L5, L6, L9 and L10 (see Comparative Example in FIG. 4) denotes total mols of magnesium hydroxide, magnesium sulfate, magnesium sulfite and magnesium hydrogensulfite. Ca in each of the lines L8 and L9 denotes mols of calcium hydroxide and gypsum dihydrate. Ca (L9) means an amount (mol/hr) of gypsum dihydrate in the line L9. Mg balance and a Ca balance both show good values.

Mg(OH)$_2$ conversion is a ratio between magnesium hydroxide [Mg(OH)$_2$ (L6)] (mol/hr) in the line L6 and calcium hydroxide [Ca(L8)] (mol/hr) fed to a double decomposition reaction.

EXAMPLE 2

The same operation as in Example 1 is carried out except that air is not fed to a second oxidation tank. Test results are shown in Table 1.

EXAMPLE 3

The same operation as in Example 1 is carried out except that a calcium ion conversion tank is bypassed. Test results are shown in Table 1.

EXAMPLE 4

In this example, one oxidation tank is used, and a coarse slurry separated by a wet classifier is led to another tank, in which accompanying magnesium hydroxide in the coarse slurry is treated with magnesium sulfate and sulfuric acid coming from the oxidation tank. Test conditions are the same as in Example 1.

FIG. 2 shows a constitutional embodiment of an apparatus for use in a method for desulfurizing an exhaust gas in this example. The apparatus shown in this drawing is the same as in FIG. 1 except that a tank 7' to which the coarse slurry separated by the wet classifier is led is not an oxidation tank but a tank to which no air is blown, that a solution to be fed thereto is not a desulfurization step treatment liquid but an aqueous solution of magnesium sulfate and sulfuric acid coming from an oxidation tank 2, and that magnesium hydroxide which accompanies gypsum dihydrate is converted into water-soluble magnesium sulfate. Thus, the description of the apparatus will be omitted. Test results are shown in Table 1.

EXAMPLE 5

In this example, one oxidation step is used and it is carried out by an oxidation tank 7, and a desulfurization step treatment liquid and a coarse particle slurry which is separated by a wet classifier and which is accompanied with magnesium hydroxide are treated on the same oxidation tank.

Figure 3:
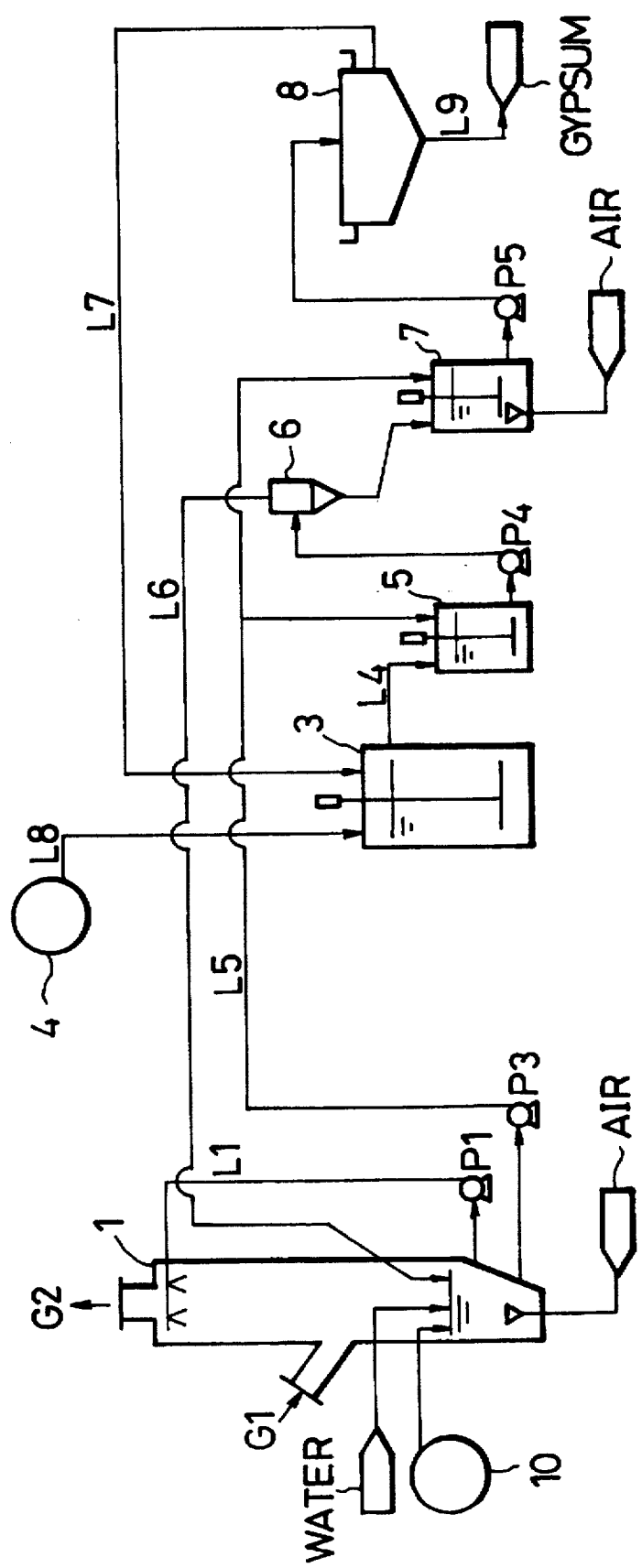
Figure 3:
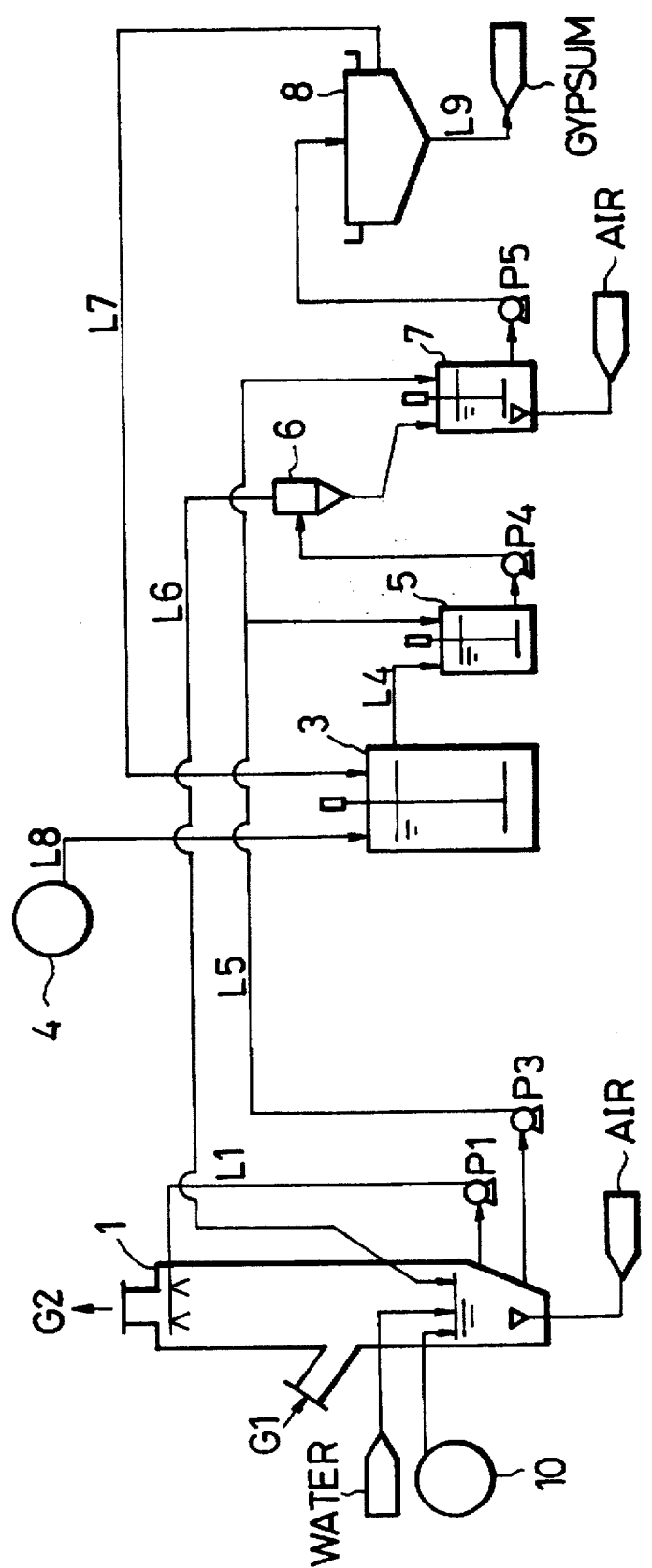

FIG. 3 shows a constitutional embodiment of an apparatus for use in a method for desulfurizing an exhaust gas in this example. The apparatus shown in this drawing is the same as in FIG. 1, except that oxidation tank 2 is omitted and the desulfurization step treatment liquid L5 and coarse particle slurry separated by wet classifier 6 are treated in oxidation tank 7.

Test results are shown in Table 1.

COMPARATIVE EXAMPLE 1

Figure 4:
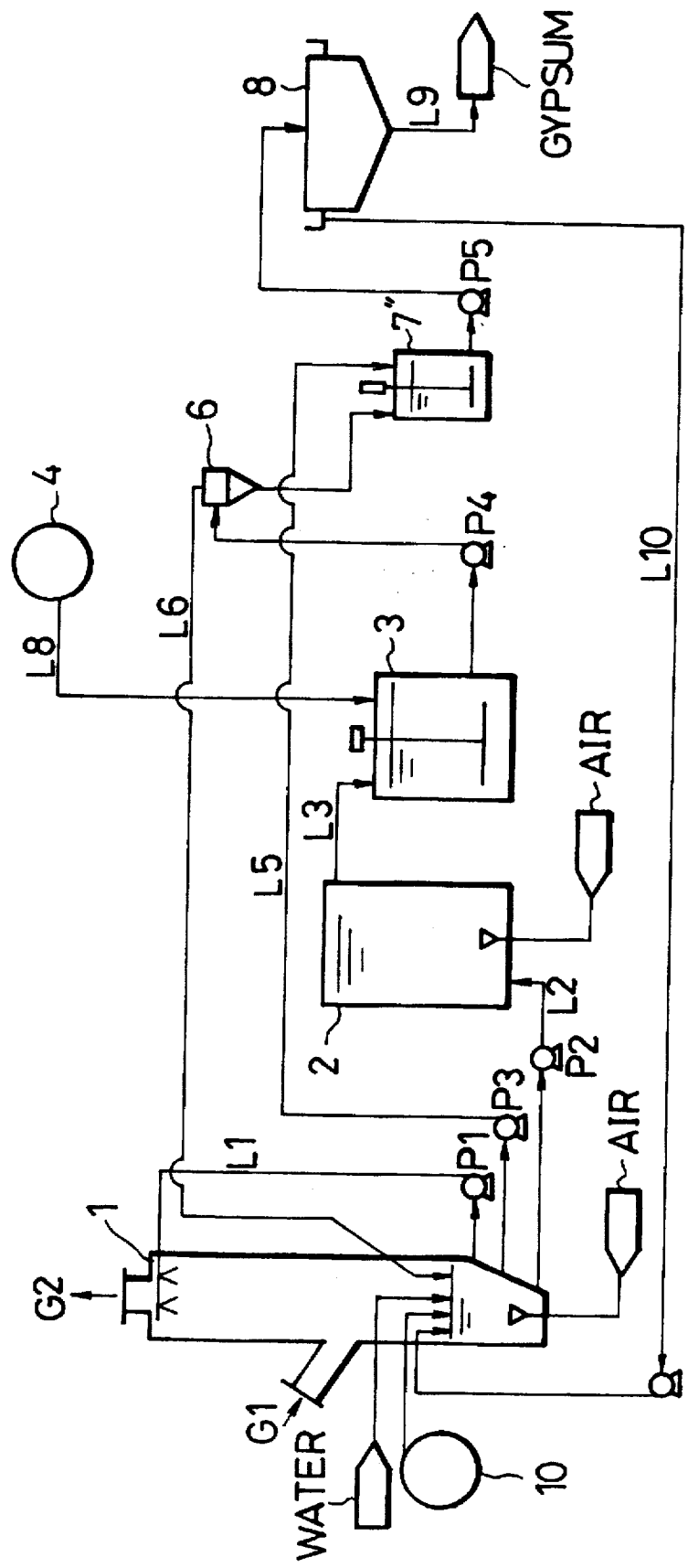
FIG. 4 is a schematic view illustrating a constitutional embodiment of an apparatus for use in a conventional desulfurization method.

In this comparative example, the same operation as in Example 1 is carried out except that no calcium ion exchange tank is used and no air is not fed to a second oxidation tank, and therefore, the tank functions as a mere mixing tank 7", and that a supernatant liquid in a sedimentation tank is not fed to a double decomposition tank but directly returned to a desulfurizing tower as a treatment liquid. A test procedure of the comparative example is shown in FIG. 4, and test results are shown in Table 1. The apparatus shown in this drawing is the same as in FIG. 1, except that no calcium ion exchange tank is used, no air is fed to tank 7, and the supernatant liquid L7 is not fed to double decomposition tank 3.

TABLE 1

(I) (Test Results)

| | Mg (mol/hr) | | | |
|---|---|---|---|---|
| | L2 + L5 | L6 | L9 | L10 |
| Example 1 | 13.9 | 13.3 | 0.440 | 0.00 |
| Example 2 | 13.9 | 13.5 | 0.340 | 0.00 |
| Example 3 | 13.9 | 13.4 | 0.480 | 0.00 |
| Example 4 | 13.9 | 13.2 | 0.540 | 0.00 |
| Example 5 | 13.9 | 13.6 | 0.240 | 0.00 |
| Comp. Ex. 1 | 13.9 | 3.57 | 0.550 | 9.80 |

(II) (Test Results)

| | $Mg(OH)_2$ (mol/hr) L6 | $Mg(OH)_2$ Conversion | Mg Balance (L6 + L9 + L10)/(L2 + L5) |
|---|---|---|---|
| Example 1 | 3.80 | 0.894 | 0.998 |
| Example 2 | 3.90 | 0.918 | 0.996 |
| Example 3 | 3.75 | 0.882 | 0.996 |
| Example 4 | 3.70 | 0.871 | 0.988 |
| Example 5 | 4.00 | 0.941 | 0.996 |
| Comp. Ex. 1 | 3.57 | 0.840 | 1.00 |

(III) (Test Results)

| | Ca(mol/hr) | | Ca Balance | Clogging State of Line L1 and Pump P1 |
|---|---|---|---|---|
| | L8 | L9 | L9/L8 | |
| Example 1 | 4.25 | 4.23 | 0.995 | No prob. for 2 years |
| Example 2 | 4.25 | 4.22 | 0.993 | No prob. for 2 years |
| Example 3 | 4.25 | 4.10 | 0.965 | Clogged in 6 months |
| Example 4 | 4.25 | 4.23 | 0.995 | No prob. for 2 years |
| Example 5 | 4.25 | 4.21 | 0.991 | No prob. for 2 years |
| Comp. Ex. 1 | 4.25 | 4.09 | 0.962 | Clogged in 6 months |

$Mg(OH)_2$ Conversion = $Mg(OH)_2(L6)/Ca(L8)$

In the above-mentioned desulfurizing method of the present invention, if conditions of a desulfurization ratio, a desulfurization liquid and the like are the same, gypsum dihydrate can be surely separated and collected by the sedimentation tank 8, and a solution containing magnesium sulfate from which gypsum dihydrate has been removed is fed to a double decomposition tank 3 via a line L7, so that the conversion of magnesium sulfate into magnesium hydroxide is in the range of 0.871 to 0.941 which is higher than 0.840 in the case of the Comparative Example, with the result that the utilization ratio of the magnesium-based desulfurizing agent can be enhanced. In addition, the calcium ions circulating through the system can be removed from the system by a calcium ion conversion tank 5, a downstream wet classifier 6, a sedimentation tank 8 and the like. In consequence, the clogging and scaling of a pump P1 and a line L1 due to the precipitation of calcium sulfite and the like do not occur and a stable operation can be maintained.

EXAMPLE 6

Figure 5:
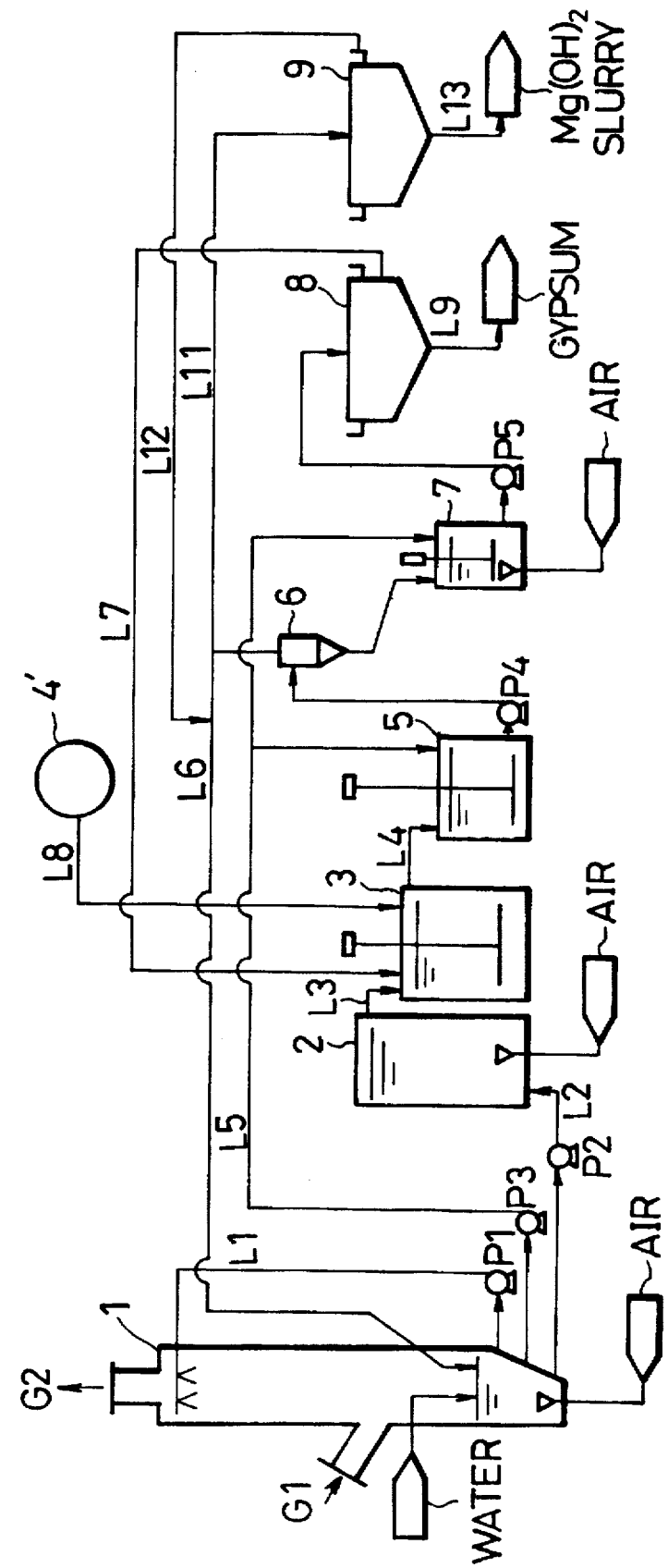

In this example of the second invention, two oxidization steps are used. FIG. 5 shows a constitutional embodiment of an apparatus for use in a method for desulfurizing an exhaust gas in this example. In this drawing, reference numeral 1 is a desulfurizing tower, and in this tower, a treatment liquid containing a magnesium-based desulfurizing agent is allowed to stream down in a showery state from the top, whereby this treatment liquid is brought into gas-liquid contact with an exhaust gas G1 containing sulfur oxides introduced from a lower portion of the tower. In consequence, the sulfur oxides are absorbed and fixed as magnesium sulfite and the like in the treating liquid by a desulfurizing reaction, and an exhaust gas G2 from which the sulfur oxides have been removed is discharged from the tower through an upper portion of the tower.

The exhaust gas fed to the desulfurizing tower has a high temperature, so it is cooled by spraying water through a nozzle. The flow rate of the exhaust gas is 100 $Nm^3$/hr, and the concentration of $SO_2$ is 1000 ppm.

The treatment liquid which has streamed down to the lower portion of the desulfurizing tower 1, i.e., the desulfurizing liquid absorbing the sulfur oxides is forwarded together with the circulated, fed and reproduced desulfurizing agent to the upper portion through a pump P1 and a line L1, and is continuously circulated through the desulfurizing tower 1 by repeating this operation cycle. The concentration of the salts in this treatment liquid is adjusted to 7.50% by weight in terms of magnesium sulfate, the total concentration of magnesium sulfite and magnesium hydrogensulfite is adjusted to 1.50% by weight in terms of magnesium sulfate, and a pH is adjusted to 6.2–6.4. As a result, a desulfurization ratio in each example can be maintained at 95%.

The desulfurization step treatment liquid is fed to a first oxidization tank 2 by a pump P2 and a line L2, and then oxidized with air to become an aqueous solution of magnesium sulfate and sulfuric acid.

The thus formed aqueous solution of magnesium sulfate and sulfuric acid is fed to a double decomposition tank 3 through a line L3. Next, to the double decomposition tank 3, an aqueous magnesium sulfate solution separated from a sedimentation tank which will be described hereinafter is fed, and an aqueous slurry containing about 30% by weight of both magnesium hydroxide and calcium hydroxide is further fed through a line L8 from a tank 4' (hereinafter referred to as "dolomite-based basic compound feed tank") storing a basic compound slurry obtained by calcining and digesting a dolomite. Afterward, these materials are stirred and mixed by a stirrer to react magnesium sulfate and sulfuric acid with calcium hydroxide, thereby producing solid particles of gypsum dihydrate and magnesium hydroxide. The reaction temperature is 50° C.. In this connection, $CaCO_3$ and $MgCO_3$ in the dolomite used in this example are substantially equimolar.

The thus obtained aqueous slurry containing the two kinds of solid particles is next led to a calcium ion conversion tank 5 through a line L4, in which the aqueous slurry is uniformly mixed by stirring with a part of the desulfurization step treatment liquid absorbing the sulfur compounds fed from the desulfurizing tower 1 via a pump P3 and a line L5, so that the calcium ions dissolved in water are reacted mainly with magnesium sulfite and magnesium hydrogensulfite in the above-mentioned treatment liquid to produce and precipitate water-insoluble calcium sulfite.

Next, the aqueous slurry containing these solid particles of gypsum dihydrate, magnesium hydroxide and calcium sulfite is led to a wet classifier 6 by means of a pump P4, and in the wet classifier, the aqueous slurry is separated into a fine particle slurry mainly containing magnesium hydroxide and a coarse particle slurry containing gypsum dihydrate, calcium sulfite and some magnesium hydroxide.

The fine particle slurry mainly containing magnesium hydroxide is divided into two portions. One portion is a slurry containing magnesium hydroxide corresponding to the amount of $SO_2$ to be absorbed in the desulfurization step, and this slurry is returned to the desulfurizing tower via a line L6. The other magnesium hydroxide slurry is led to a concentration separation tank 9 of the magnesium hydroxide slurry via a line L11, and in this tank, it is concentrated to a 35% by weight slurry and then taken out from the system via a line L13. Water separated and discharged is returned to the desulfurizing tower via a line L12.

The coarse particle slurry mainly containing gypsum dihydrate is led to a second oxidation tank 7, in which while air is blown, the coarse particle slurry is uniformly mixed by a stirrer with a part of the desulfurization step treatment liquid absorbing the sulfur compounds fed from the desulfurizing tower 1 via the pump P3 and the line L5, so that magnesium hydroxide which accompanies gypsum dihydrate is reacted with sulfuric acid produced by the oxidation of magnesium hydrogensulfite to be converted into water-soluble magnesium sulfate.

This solution containing magnesium sulfate is led to a sedimentation tank 8 together with gypsum dihydrate dispersed therein and is unconcerned with the above-mentioned reaction. In the sedimentation tank, the solution is separated into gypsum dihydrate and a solution containing magnesium sulfate. Afterward, gypsum dihydrate in a lower portion is taken out from the system through a line L9, and the solution containing magnesium sulfate in an upper portion is returned to the double decomposition tank 3 via a line 7.

Test results are shown in Table 2. In this table, Mg (mol/hr) and Ca (mol/hr) are amounts (mol/hr) of magnesium and calcium in terms of magnesium sulfate and gypsum dihydrate, respectively, in the lines represented by line symbols. Among them, Mg in each of the lines L2, L5, L6, L9, L10 and L13 denotes total mols of magnesium hydroxide, magnesium sulfate, magnesium sulfite and magnesium hydrogensulfite. Ca in each of the lines L8 and L9 denotes mols of calcium hydroxide and gypsum dihydrate. Ca (L9) means an amount (mol/hr) of gypsum dihydrate in the line L9. Mg balance and Ca balance both show good values.

$Mg(OH)_2$ conversion is a ratio between a value obtained by subtracting the flow rate of magnesium hydroxide in the line L8 from the total value of magnesium hydroxide in the lines L6 and L13 and the flow rate of calcium hydroxide in the line L8.

EXAMPLE 7

The same operation as in Example 6 is carried out except that air is not fed to a second oxidation tank. Test results are shown in Table 2.

EXAMPLE 8

The same operation as in Example 6 is carried out except that a calcium ion conversion tank is by-passed. Test results are shown in Table 2.

EXAMPLE 9

In this example, one oxidation tank is used, and a coarse slurry separated by a wet classifier is led to another tank, in which accompanying magnesium hydroxide in the coarse slurry is treated with magnesium sulfate and sulfuric acid coming from the oxidation tank. Test conditions are the same as in Example 6.

Figure 6:
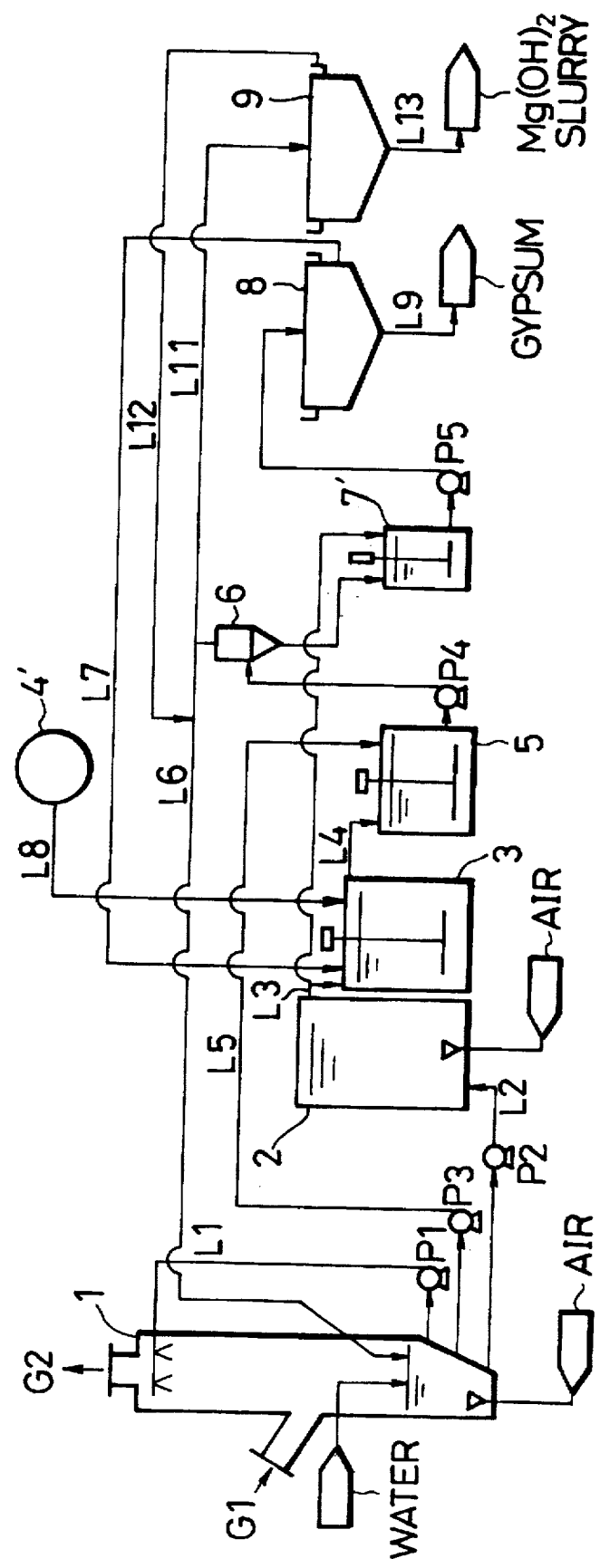

FIG. 6 shows a constitutional embodiment of an apparatus for use in a method for desulfurizing an exhaust gas in this example. The apparatus shown in this drawing is the same as in FIG. 5 except that a tank 7' to which the coarse slurry separated by the wet classifier is led is not to an oxidation tank but to a tank to which no air is blown, that a solution to be fed thereto is not a desulfurization step treatment liquid but an aqueous solution of magnesium sulfate and sulfuric acid coming from an oxidation tank 2, and that magnesium hydroxide which accompanies gypsum dihydrate is converted by this aqueous solution into water-soluble magnesium sulfate. Thus, the description of the apparatus will be omitted. Test results are shown in Table 2.

EXAMPLE 10

In this example, one oxidation step is used and it is carried out by an oxidation tank 7, and a desulfurization step treatment liquid and a coarse particle slurry which is separated by a wet classifier and which is accompanied with magnesium hydroxide are treated on the same oxidation tank. FIG. 7 shows a constitutional embodiment of an apparatus for use in a method for desulfurizing an exhaust gas in this example. Test results are shown in Table 2. The apparatus shown in this drawing is as in FIG. 6, except that oxidation tank 2 is omitted and the desulfurization step treatment liquid L5 and coarse particle slurry separated by wet classifier 6 accompanied by magnesium hydroxide are treated in oxidation tank 7.

COMPARATIVE EXAMPLE 1

In this comparative example, the same operation as in Example 6 is carried out except that a basic compound fed to a double decomposition tank is calcium hydroxide from a calcium hydroxide feed tank 4, no calcium ion exchange tank is used and no air is fed to a second oxidation tank, and therefore, the tank functions as a mere mixing tank 7", and that a supernatant liquid in a sedimentation tank is not fed to the double decomposition tank but directly returned to a desulfurizing tower as a treatment liquid. Test results are shown in Table 2. In this case, mols of magnesium hydroxide which are reproduced and circulated are fewer than those of $SO_2$ absorbed by the desulfurizing tower, and so this shortage is supplied with magnesium hydroxide from a supply tank 10.

In the above-mentioned desulfurizing method of the present invention, if conditions of a desulfurization ratio, a desulfurization liquid and the like are the same, gypsum dihydrate can be surely separated and collected by the sedimentation tank 8, and a solution containing magnesium sulfate from which gypsum dihydrate has been removed is fed to a double decomposition tank 3 via a line L7, so that the conversion of magnesium sulfate into magnesium hydroxide is in the range of from 0.871 to 0.941 which is higher than 0.840 in the case of Comparative Example, with the result that the utilization ratio of the magnesium-based desulfurizing agent can be enhanced. In addition, the calcium ions circulating through the system can be removed from the system by a calcium ion conversion tank 5, a downstream wet classifier 6, a sedimentation tank 8 and the like. In consequence, the clogging and scaling of a pump P1 and a line L1 due to the precipitation of calcium sulfite and the like do not occur and a stable operation can be maintained.

TABLE 2

(I) (Test Results)

| | Mg (mol/hr) | | | | |
|---|---|---|---|---|---|
| | L2 + L5 | L6 + L13 | L8 | L9 | L10 |
| Example 6 | 13.9 | 17.6 | 4.25 | 0.440 | 0.00 |
| Example 7 | 13.9 | 17.8 | 4.25 | 0.340 | 0.00 |
| Example 8 | 13.9 | 17.5 | 4.25 | 0.740 | 0.00 |
| Example 9 | 13.9 | 17.4 | 4.25 | 0.540 | 0.00 |
| Example 10 | 13.9 | 17.9 | 4.25 | 0.240 | 0.00 |
| Comp. Ex. 1 | 13.9 | 3.57 | 0.00 | 0.550 | 9.80 |

(II) (Test Results)

| | $Mg(OH)_2$ (mol/hr) | | $Mg(OH)_2$ | Mg |
|---|---|---|---|---|
| | L6 | L13 | Conversion | Balance |
| Example 6 | 4.24 | 3.80 | 0.894 | 0.994 |
| Example 7 | 4.24 | 3.92 | 0.918 | 0.999 |
| Example 8 | 4.24 | 3.76 | 0.824 | 1.005 |
| Example 9 | 4.24 | 3.71 | 0.871 | 0.988 |
| Example 10 | 4.24 | 4.01 | 0.941 | 0.999 |
| Comp. Ex. 1 | 3.57 | 0.00 | 0.840 | 1.001 |

(III) (Test Results)

| | Ca(mol/hr) | | | Clogging State of Line L1 and |
|---|---|---|---|---|
| | L8 | L9 | Ca Balance | Pump P1 |
| Example 6 | 4.25 | 4.23 | 0.995 | No prob. for 2 years |
| Example 7 | 4.25 | 4.22 | 0.993 | No prob. for 2 years |
| Example 8 | 4.25 | 4.10 | 0.965 | Clogged in 6 months |
| Example 9 | 4.25 | 4.23 | 0.995 | No prob. for 2 years |
| Example 10 | 4.25 | 4.21 | 0.991 | No prob. for 2 years |
| Comp. Ex. 1 | 4.25 | 4.09 | 0.962 | Clogged in in 6 months |

$Mg(OH)_2$ Conversion = $Mg(OH)_2$ (L6 + L13 − L8)/Ca(L8)
Mg balance = Mg(L6 +L9 + L10 + L13)/Mg(L2 + L5 + L8)
Ca balance = Ca(L9)/Ca(L8)
Ca(L8) = Mg(L8)

As described above, according to a method for desulfurizing an exhaust gas of the present invention, the separation and collection of gypsum dihydrate and the utilization ratio of the magnesium-based desulfurizing agent can be enhanced. In addition, in a desulfurizing tower, there can be completely prevented the deposition of a residue which causes the scale adhesion in and the clogging of a circulation system in a desulfurizing tower, so that a stable operation can be maintained at a low cost and the exhaust gas can be efficiently desulfurized. In the second invention, mols of magnesium hydroxide in a solution obtained from a double decomposition tank are more than those of $SO_2$ to be absorbed in the desulfurizing tower, and therefore the amount of magnesium hydroxide which is necessary and sufficient for the mols of $SO_2$ to be absorbed can be circulated through the desulfurizing tower. In consequence, it is not necessary to newly supply the desulfurizing tower with magnesium hydroxide. Excessive magnesium hydroxide can be taken out as a by-product from the system and then used for another use.

What is claimed is:

1. A method for desulfurization which comprises a desulfurization step of continuously bringing a treatment liquid containing a magnesium-based desulfurizing agent into gas-liquid contact with an exhaust gas containing sulfur oxides to absorb and remove the sulfur oxides contained in the exhaust gas; an oxidation step of treating, with a gas containing oxygen, the solution containing the resulting desulfurization step treatment liquid to convert contained magnesium salts into magnesium sulfate and produce sulfuric acid; a double decomposition step of reacting magnesium sulfate contained in the solution obtained from the oxidation step with added calcium compounds selected from the group consisting of CaO, $Ca(OH)_2$, $CaCO_3$, dolomite and mixtures thereof to convert by double decomposition the magnesium sulfate and the calcium compounds into magnesium hydroxide and gypsum dihydrate; a separation step of separating a slurry of a mixture of magnesium hydroxide and gypsum dihydrate obtained in the double decomposition step into a magnesium hydroxide slurry and a gypsum dihydrate slurry by a wet classifier; a step of returning the magnesium hydroxide slurry separated in the separation step to the desulfurization step; a step of treating the gypsum dihydrate slurry separated in the separation step to convert accompanying magnesium hydroxide into magnesium sulfate by its reaction with sulfuric acid produced by said oxidation; a sedimentation separation step of sedimenting and separating solid gypsum dihydrate from the resulting gypsum dihydrate and magnesium sulfate slurry; and a step of returning a supernatant liquid from the sedimentation separation step comprising magnesium sulfate to the double decomposition step to treat the supernatant liquid.

2. A method for desulfurization which comprises a desulfurization step of continuously bringing a treatment liquid containing a magnesium-based desulfurizing agent into gas-liquid contact with an exhaust gas containing sulfur oxides to absorb and remove the sulfur oxides contained in the exhaust gas; an oxidation step of treating, with a gas containing oxygen, part of the solution containing the resulting desulfurization step treatment liquid to convert contained magnesium salts into magnesium sulfate; a double decomposition step of reacting magnesium sulfate contained in the solution obtained in the oxidation step with added calcium compounds selected from the group consisting of CaO, $Ca(OH)_2$, $CaCO_3$, dolomite and mixtures thereof to decompose the magnesium sulfate and the calcium compounds into magnesium hydroxide and gypsum dihydrate; a step of feeding part of the desulfurization step treatment liquid to a calcium ion conversion chamber containing a mixed slurry of magnesium hydroxide and gypsum dihydrate obtained in the double decomposition step to react with dissolved calcium ions to produce calcium sulfite; a separation step of separating a magnesium hydroxide slurry from the slurry containing gypsum dihydrate particles and calcium sulfite particles by a wet classifier; and a step of returning the magnesium hydroxide slurry separated by the wet classifier to the desulfurization step.

3. A method for desulfurization which comprises a desulfurization step of continuously bringing a treatment liquid containing a magnesium-based desulfurizing agent into gas-liquid contact with an exhaust gas containing sulfur oxides to absorb and remove the sulfur oxides contained in the exhaust gas; an oxidation step of treating, with a gas containing oxygen, the solution containing the resulting desulfurization step treatment liquid to convert contained magnesium salts into magnesium sulfate and produce sulfuric acid; a double decomposition step of reacting magnesium sulfate contained in the solution obtained in the oxidation step with basic compounds comprising magnesium hydroxide and calcium hydroxide obtained by calcining and digesting a dolomite, thereby decomposing the magnesium sulfate and the basic compounds into magnesium hydroxide and gypsum dihydrate; a separation step of separating a slurry of a mixture of magnesium hydroxide and gypsum dihydrate obtained in the double decomposition step into a magnesium hydroxide slurry and a gypsum dihydrate slurry by a wet classifier; returning a part of the magnesium hydroxide slurry separated in the separation step to the desulfurization step; removing the resulting magnesium hydroxide slurry out of the system; a step of treating the gypsum dihydrate slurry separated in the separation step to convert accompanying magnesium hydroxide into magnesium sulfate by its reaction with sulfuric acid produced by said oxidation; a sedimentation separation step of sedimenting and separating solid gypsum dihydrate from the resulting gypsum dihydrate and magnesium sulfate slurry; a step of returning a supernatant liquid in the sedimentation separation step comprising magnesium sulfate to the double decomposition step to treat the supernatant liquid.

4. A method of desulfurization which comprises a desulfurization step of continuously bringing a treatment liquid containing a magnesium-based desulfurizing agent into gas-liquid contact with an exhaust gas containing sulfur oxides to absorb and remove the sulfur oxides contained in the exhaust gas; an oxidation step of treating, with a gas containing oxygen, the solution containing the resulting desulfurization step treatment liquid to convert contained magnesium salts into magnesium sulfate; a double decomposition step of reacting magnesium sulfate contained in the solution obtained in the oxidation step with basic compounds comprising magnesium hydroxide and calcium hydroxide obtained by calcining and digesting a dolomite to decompose the magnesium sulfate and the basic compounds into magnesium hydroxide and gypsum dihydrate; a step of feeding part of the solution containing the resulting desulfurization step treatment liquid to a calcium ion conversion chamber containing the slurry of magnesium hydroxide and gypsum dihydrate mixture obtained from the double decomposition step to react with dissolved calcium ions to produce calcium sulfite; a separation step of separating a magnesium hydroxide slurry from the slurry containing gypsum dihydrate particles and calcium sulfite particles by a wet classifier; a step of returning a part of the magnesium hydroxide slurry separated by the wet classifier to the desulfurization step in an amount corresponding to the amount of $SO_2$ to be absorbed; and a step of taking out the remaining magnesium hydroxide slurry from a system as a by-product.

5. The method for desulfurization according to claim 1 or 3 which comprises adding, after the double decomposition step, a calcium ion conversion step of feeding the desulfurization step treatment liquid to a slurry of magnesium hydroxide and gypsum dihydrate mixture obtained in the double decomposition step to convert dissolved calcium ions into calcium sulfite.

6. A method for desulfurization which comprises a desulfurization step of continuously bringing a treatment liquid containing a magnesium-based desulfurizing agent into gas-liquid contact with an exhaust gas containing sulfur oxides to absorb and remove the sulfur oxides contained in the exhaust gas; an oxidation step of treating, with a gas containing oxygen, part of the resulting desulfurization step treatment liquid to convert contained magnesium salts into magnesium sulfate and produce sulfuric acid; a double decomposition step of reacting magnesium sulfate contained in the solution obtained from the oxidation step with added calcium compounds selected from the group consisting of CaO, $Ca(OH)_2$, $CaCO_3$, dolomite and mixtures thereof to convert by double decomposition the magnesium sulfate and the calcium compounds into magnesium hydroxide and gypsum dihydrate; a separation step of separating a magnesium hydroxide slurry from the slurry containing gypsum dihydrate particles and calcium sulfite particles by a wet classifier; a step of returning the magnesium hydroxide slurry separated in the separation step to the desulfurization step; a step of treating the gypsum dihydrate slurry separated in the separation step to convert accompanying magnesium hydroxide into magnesium sulfate by its reaction with sulfuric acid produced by feeding part of the desulfurization step treatment liquid and a gas containing oxygen; a sedimentation separation step of sedimenting and separating solid gypsum dihydrate from the resulting gypsum dihydrate and magnesium sulfate slurry; and a step of returning a supernatant liquid from the sedimentation separation step comprising magnesium sulfate to the double decomposition step to treat the supernatant liquid.

7. A method for desulfurization which comprises a desulfurization step of continuously bringing a treatment liquid containing a magnesium-based desulfurizing agent into gas-liquid contact with an exhaust gas containing sulfur oxides to absorb and remove the sulfur oxides contained in the exhaust gas; an oxidation step of treating, with a gas containing oxygen, part of the resulting desulfurization step treatment liquid to convert contained magnesium salts into magnesium sulfate and produce sulfuric acid; a double decomposition step of reacting magnesium sulfate contained in the solution obtained from the oxidation step with added calcium compounds selected from the group consisting of CaO, $Ca(OH)_2$, $CaCO_3$, dolomite and mixtures thereof to convert by double decomposition the magnesium sulfate and the calcium compounds into magnesium hydroxide and gypsum dihydrate; a step of feeding part of the desulfurization step treatment liquid to a calcium ion conversion chamber containing a mixed slurry of magnesium hydroxide and gypsum dihydrate obtained in the double decomposition step to react with dissolved calcium ions to produce calcium sulfite; a separation step of separating a magnesium hydroxide slurry from the slurry containing gypsum dihydrate particles and calcium sulfite particles by a wet classifier; a step of returning the magnesium hydroxide slurry separated in the separation step to the desulfurization step; a step of treating the gypsum dihydrate slurry separated in the separation step to convert accompanying magnesium hydroxide into magnesium sulfate by its reaction with sulfuric acid produced by feeding part of the desulfurization step treatment liquid and a gas containing oxygen; a sedimentation separation step of sedimenting and separating solid gypsum dihydrate from the resulting gypsum dihydrate and magnesium sulfate slurry; and a step of returning a supernatant liquid from the sedimentation separation step comprising magnesium sulfate to the double decomposition step to treat the supernatant liquid.

8. A method for desulfurization which comprises a desulfurization step of continuously bringing a treatment liquid containing a magnesium-based desulfurizing agent into gas-liquid contact with an exhaust gas containing sulfur oxides to absorb and remove the sulfur oxides contained in the exhaust gas; an oxidation step of treating, with a gas containing oxygen, part of the resulting desulfurization step treatment liquid to convert contained magnesium salts into magnesium sulfate and produce sulfuric acid; a double decomposition step of reacting magnesium sulfate contained in the solution obtained from the oxidation step with added calcium compounds selected from the group consisting of CaO, $Ca(OH)_2$, $CaCO_8$, dolomite and mixtures thereof to convert by double decomposition the magnesium sulfate and the calcium compounds into magnesium hydroxide and gypsum dihydrate; a step of feeding part of the desulfurization step treatment liquid to a calcium ion conversion chamber containing a mixed slurry of magnesium hydroxide and gypsum dihydrate obtained in the double decomposition step to react with dissolved calcium ions to produce calcium sulfite; a separation step of separating a magnesium hydroxide slurry from the slurry containing gypsum dihydrate particles and calcium sulfite particles by a wet classifier; a step of returning the magnesium hydroxide slurry separated in the separation step to the desulfurization step; a step of treating the gypsum dihydrate slurry separated in the separation step to convert accompanying magnesium hydroxide into magnesium sulfate by its reaction with sulfuric acid produced by said oxidation; a sedimentation separation step of sedimenting and separating solid gypsum dihydrate from the resulting gypsum dihydrate and magnesium sulfate slurry; and a step of returning a supernatant liquid from the sedimentation separation step comprising magnesium sulfate to the double decomposition step to treat the supernatant liquid.

9. A method for desulfurization which comprises a desulfurization step of continuously bringing a treatment liquid containing a magnesium-based desulfurizing agent into gas-liquid contact with an exhaust gas containing sulfur oxides to absorb and remove the sulfur oxides contained in the exhaust gas; a step of feeding part of said resulting desulfurization step treatment liquid and a gypsum dihydrate slurry separated by a wet classifier to an oxidation step; said oxidation step of treating, with a gas containing oxygen, to convert contained magnesium salts in said resulting desulfurization step treatment liquid and accompanied magnesium hydroxide with said gypsum dihydrate slurry into magnesium sulfate; a sedimentation separation step of sedimenting and separating a supernatant liquid from solid gypsum dihydrate in the resulting oxidation step treatment liquid; a step of returning a supernatant liquid from the sedimentation separation step comprising magnesium sulfate to the double decomposition step to treat the supernatant liquid; a double decomposition step of reacting magnesium sulfate contained in the supernatant liquid with added calcium compounds selected from the group consisting of CaO, $Ca(OH)_2$, $CaCO_3$, dolomite and mixtures thereof to convert by double decomposition the magnesium sulfate and the calcium compounds into magnesium hydroxide and gypsum dihydrate; a step of feeding part of the desulfurization step treatment liquid to a calcium ion conversion chamber containing a mixed slurry of magnesium hydroxide and gypsum dihyrdrate obtained in the double decomposition step to react with dissolved calcium ions to produce calcium sulfite; a separation step of separating a magnesium hydroxide slurry from the slurry containing gypsum dihydrate particles and calcium sulfite particles by said wet classifier; a step of returning the magnesium hydroxide slurry separated in the separation step to the desulfurization step.

* * * * *